United States Patent
Corrion et al.

[11] Patent Number: 5,484,190
[45] Date of Patent: Jan. 16, 1996

[54] SEAT BELT RETRACTOR LOCK

[75] Inventors: Steven G. Corrion, Oxford; Donald E. Foxworth, Marysville, both of Mich.

[73] Assignee: TRW Vehicle Safety Systems Inc., Lyndhurst, Ohio

[21] Appl. No.: 147,063

[22] Filed: Nov. 3, 1993

[51] Int. Cl.⁶ .......................... B60R 22/357; B60R 22/40
[52] U.S. Cl. ...................... 297/476; 242/382; 242/384.5; 297/478
[58] Field of Search ................... 242/382, 384.7, 242/384, 384.1, 384.2, 384.3, 384.4, 384.5, 384.6, 382.2; 297/476, 477, 478, 472, 474; 280/806, 807

[56] References Cited

U.S. PATENT DOCUMENTS

| | | | |
|---|---|---|---|
| 3,278,231 | 10/1966 | Hirsch et al. | |
| 3,294,447 | 12/1966 | Riley | 297/476 |
| 3,323,831 | 6/1967 | Buechler | |
| 3,890,003 | 6/1975 | Close | |
| 3,915,401 | 10/1975 | Takada | |
| 4,085,905 | 4/1978 | Lindbald | 242/384 X |
| 4,280,584 | 7/1981 | Makishima | 242/384 X |
| 4,337,906 | 7/1982 | Colasanti | 242/384.5 X |
| 4,390,143 | 6/1983 | Takagi | 242/384.5 X |
| 4,720,148 | 1/1983 | Anthony et al. | 297/476 |
| 4,732,409 | 3/1988 | Colasanti | 280/808 |
| 5,192,035 | 3/1993 | Dufour | 242/384.5 |
| 5,267,377 | 12/1993 | Gillis et al. | 24/637 |
| 5,269,051 | 12/1993 | McFalls | 24/637 |
| 5,398,997 | 3/1995 | McFalls | 297/476 |

*Primary Examiner*—John M. Jillions
*Attorney, Agent, or Firm*—Tarolli, Sundheim & Covell

[57] ABSTRACT

A seat belt retractor (18) includes a frame (110), a spool (112), and a locking pawl (126). The spool (112) has ratchet teeth (122) and is supported on the frame (110) for rotation in a seat belt winding direction and a seat belt unwinding direction. The pawl (126) is movable into a locking position in which it extends into the path of movement of the ratchet teeth (122) to block rotation of the spool (112) in the unwinding direction. The retractor (18) further includes an actuator assembly (150) for moving the pawl (126) into the locking position. The actuator assembly (150) includes a first actuator member (152), a second actuator member (154) and a spring (156). The first actuator member (152) is supported for movement into an actuated position against the bias of the spring (156). The second actuator member (154) is supported for movement with the first actuator member (152). The second actuator member (154) is thus movable against the pawl (126) to move the pawl (126) into the locking position upon movement of the first actuator member (152) into the actuated position.

20 Claims, 7 Drawing Sheets

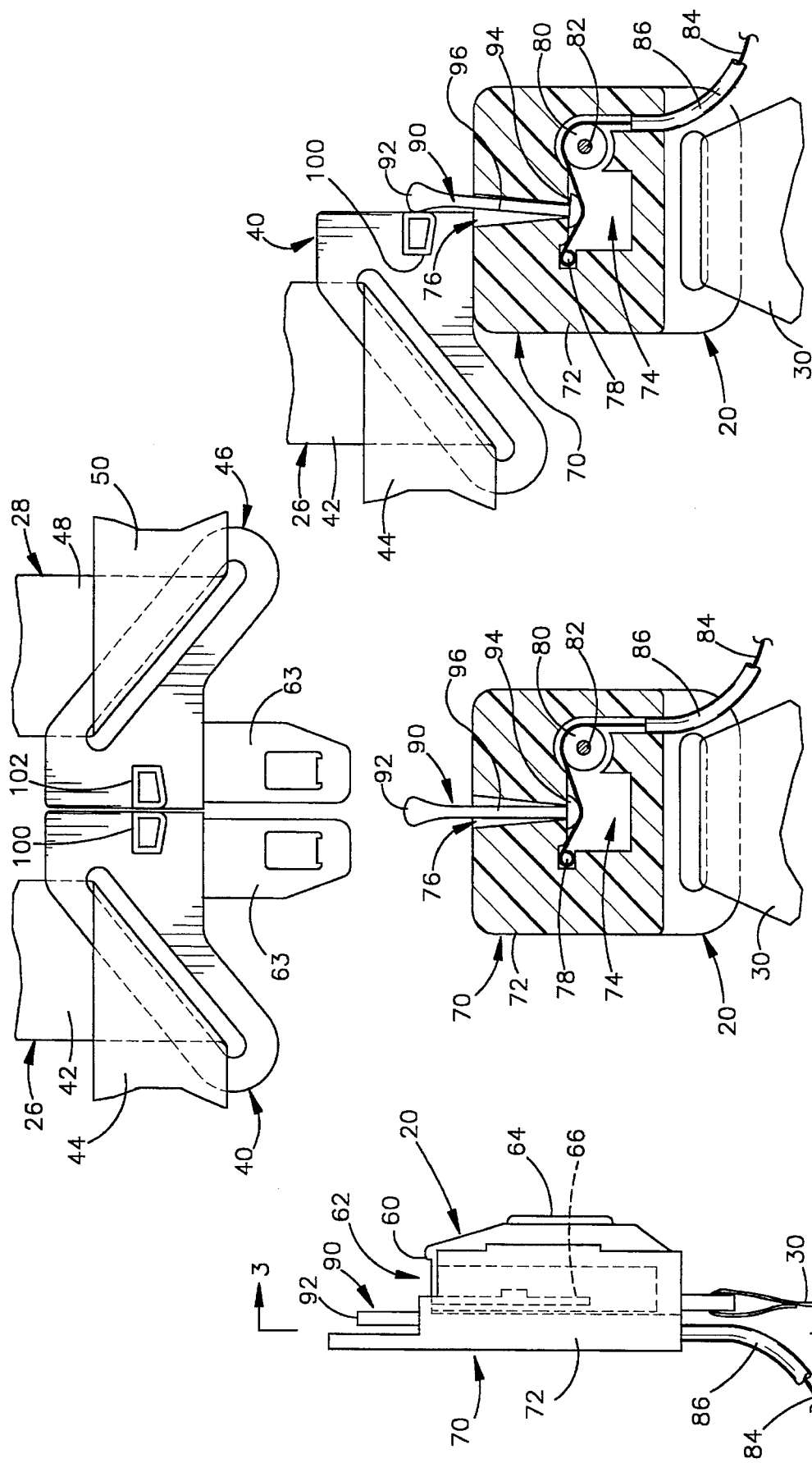

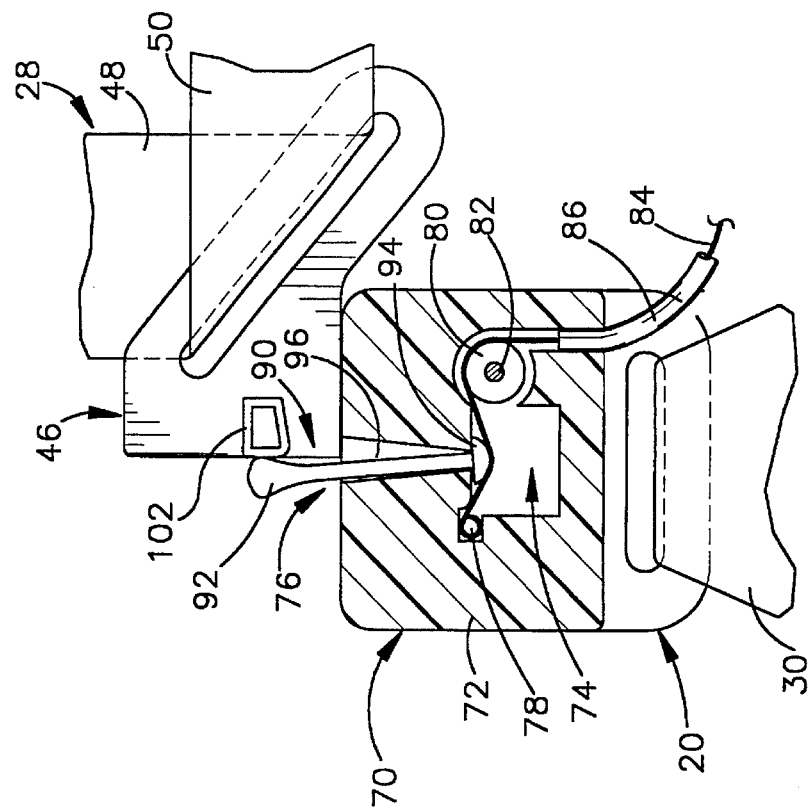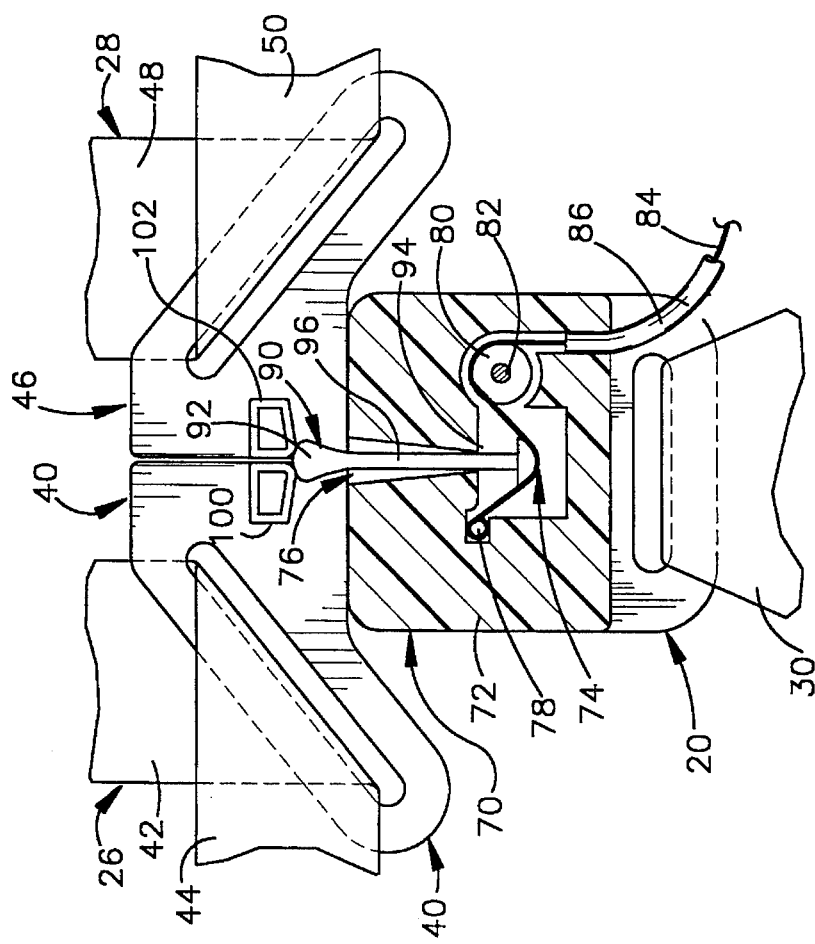

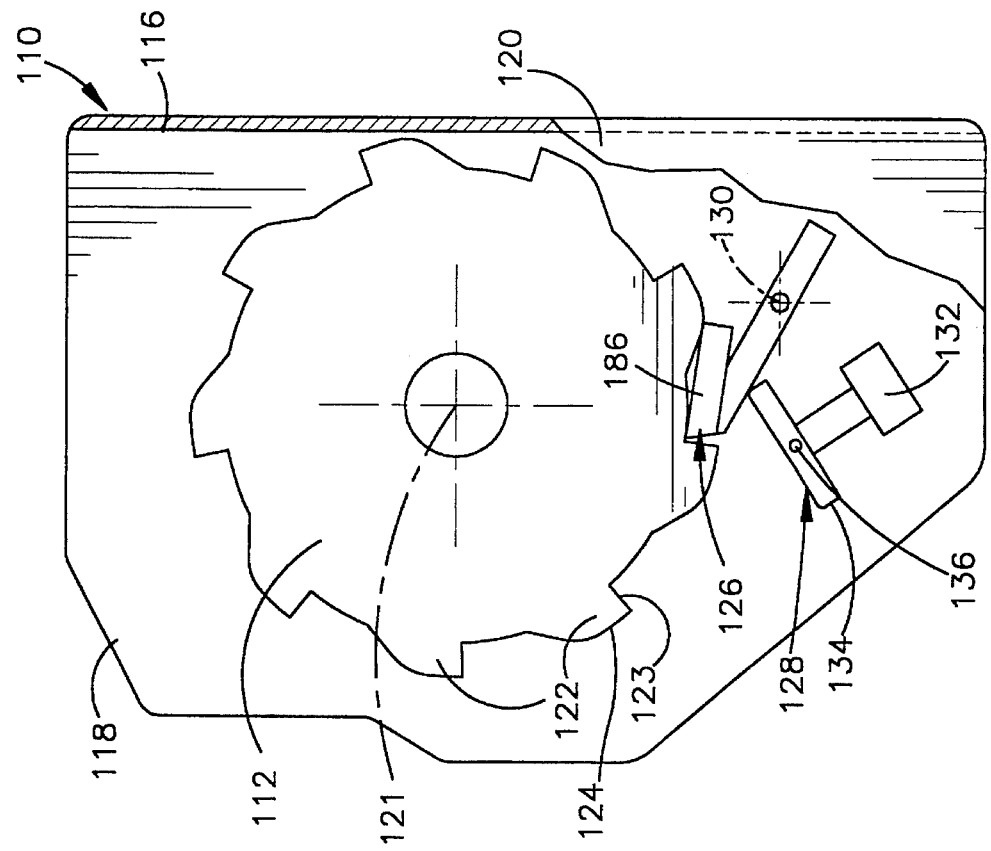
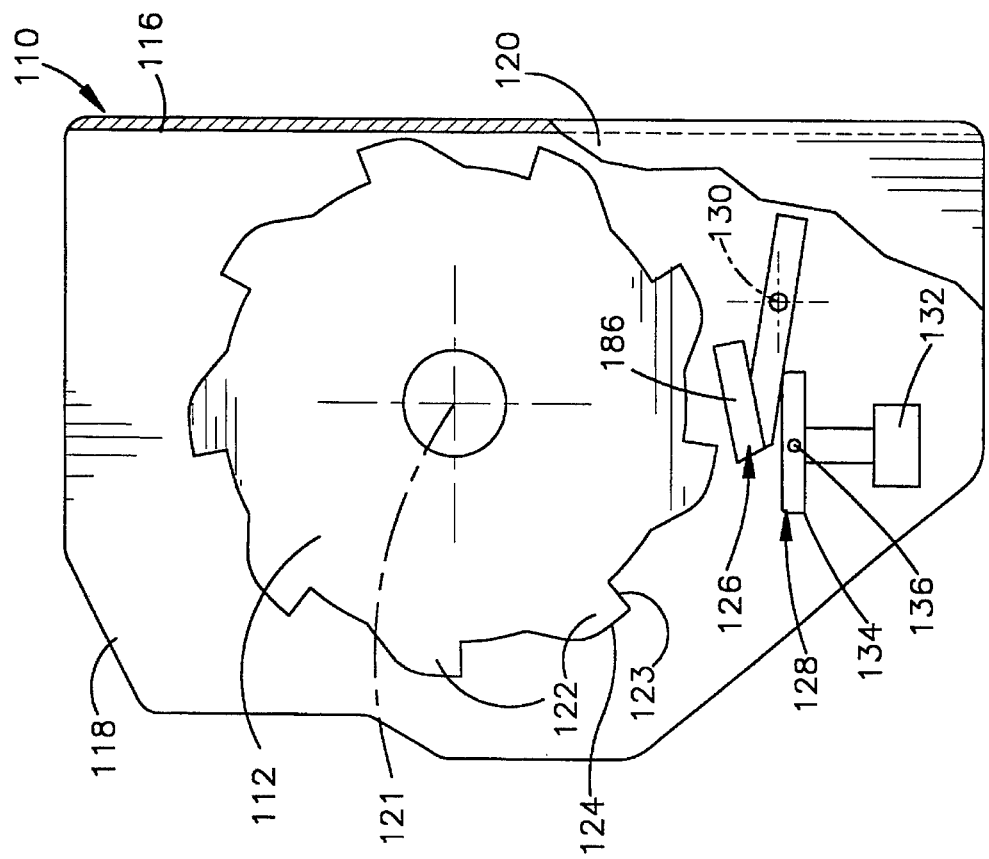

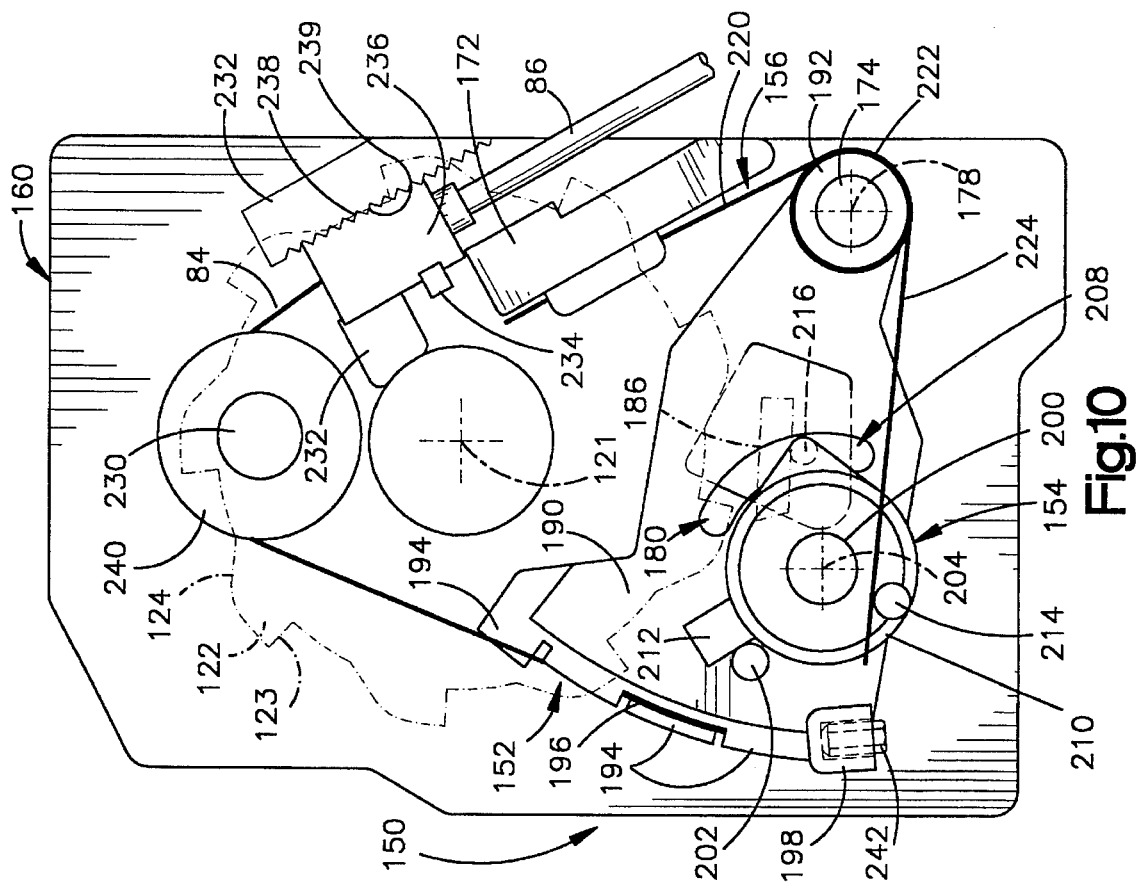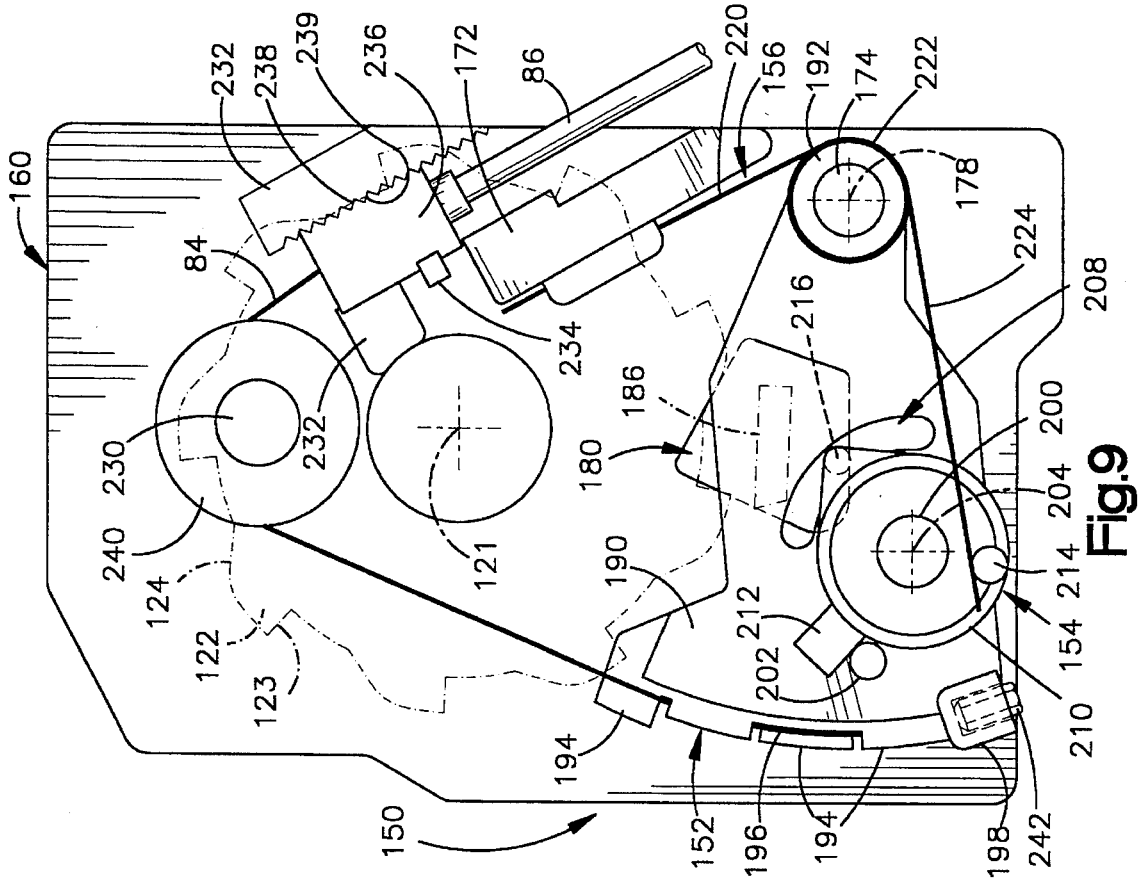

5,484,190

SEAT BELT RETRACTOR LOCK

FIELD OF THE INVENTION

The present invention relates to a seat belt system for restraining an occupant of a vehicle, and particularly relates to a seat belt retractor in which seat belt webbing is wound on a spool.

BACKGROUND OF THE INVENTION

A seat belt system for restraining an occupant of a vehicle ordinarily includes seat belt webbing, a buckle and a retractor. A locking tongue is connected to the webbing and is releasably lockable in the buckle when the webbing is extended around the vehicle occupant. The retractor includes a spool upon which the webbing is wound. The spool in the retractor rotates in an unwinding direction when the vehicle occupant withdraws the webbing from the retractor and moves the webbing toward the extended position in which the tongue is locked in the buckle. When the tongue is subsequently unlocked and released from the buckle, a rewind spring in the retractor rotates the spool in a winding direction to draw the webbing back into the retractor, and thus to move the webbing back from the extended position to a retracted position.

When the vehicle experiences a collision, the vehicle decelerates and the vehicle occupant wearing the seat belt webbing moves forcefully against the webbing. The force which is then applied to the webbing by the vehicle occupant urges the webbing to move outward from the retractor. Therefore, a retractor in a seat belt system ordinarily includes an emergency locking mechanism which blocks rotation of the spool in the unwinding direction upon the occurrence of vehicle deceleration indicative of a collision. The emergency locking mechanism thus prevents the webbing from being further withdrawn from the retractor when the vehicle experiences a collision.

It is sometimes desirable to prevent the webbing from being further withdrawn from the retractor throughout the time that the webbing is secured around the vehicle occupant, i.e., to maintain the webbing in a cinched condition. For example, it is often desirable to maintain the webbing in a cinched condition in a child seat belt system. A child seat belt system having means for maintaining the webbing in a cinched condition is disclosed in co-pending U.S. patent application Ser. No. 117,604, filed Sep. 7, 1993, now U.S. Pat. No. 5,398,997 entitled "Seat Belt System with Buckle-Responsive Retractor Lock," and assigned to TRW Vehicle Safety Systems Inc. In that system, two tongues are connected to the webbing to secure two respective sections of the webbing in positions extending around a seated child. The retractor is locked to prevent rotation of the spool in the unwinding direction in response to locking of the two tongues in a buckle.

SUMMARY OF THE INVENTION

In accordance with the present invention, a seat belt retractor includes a frame, a spool and a locking pawl. The spool has ratchet teeth, and is supported on the frame for rotation in a winding direction and an unwinding direction. The pawl is supported on the frame for movement between an unlocking position and a locking position. When the pawl is in the unlocking position it is spaced from the ratchet teeth on the spool. When the pawl is in the locking position, it extends into the path of movement of the ratchet teeth to block rotation of the spool in the unwinding direction.

The retractor further includes an actuator means for moving the pawl from the unlocking position to the locking position. The actuator means includes a first actuator member, a second actuator member, and a spring.

The first actuator member is supported for movement relative to the frame against the bias of the spring, and is thus movable into an actuated position. The second actuator member is supported for movement relative to the frame with the first actuator member. The second actuator member is thus movable against the pawl to move the pawl from the unlocking position to the locking position upon movement of the first actuator member into the actuated position.

A preferred embodiment of the present invention further comprises a cable, a locking tongue connectable with seat belt webbing, and a buckle. The buckle has locking means for locking the tongue in the buckle. An indicator means is associated with the buckle and moves the cable into an indicating position in response to locking of the tongue in the buckle. The actuator means moves the pawl from the unlocking position to the locking position in response to movement of the cable into the indicating position.

BRIEF DESCRIPTION OF THE DRAWINGS

Further features of the present invention will become apparent to those skilled in the art to which the present invention relates from reading the following description with reference to the accompanying drawings, in which:

FIG. 2 is a side view of parts of the seat belt system of FIG. 1;

FIG. 3 is a view taken on line 3—3 of FIG. 2;

FIG. 4 is a view showing the parts of FIG. 3 in partially actuated positions;

FIG. 5 is a view showing the parts of FIG. 3 in fully actuated positions;

FIG. 6 is a view showing the parts of FIG. 3 in alternative partially actuated positions;

FIG. 7A is a schematic view showing other parts of the seat belt system of FIG. 1 in unactuated positions;

FIG. 7B is a view showing the parts of FIG. 7A in actuated positions;

FIG. 9 is a view showing the parts of FIG. 8 in unactuated positions;

FIG. 10 is a view showing the parts of FIG. 8 in partially actuated positions;

DESCRIPTION OF PREFERRED EMBODIMENTS

Figure 1:
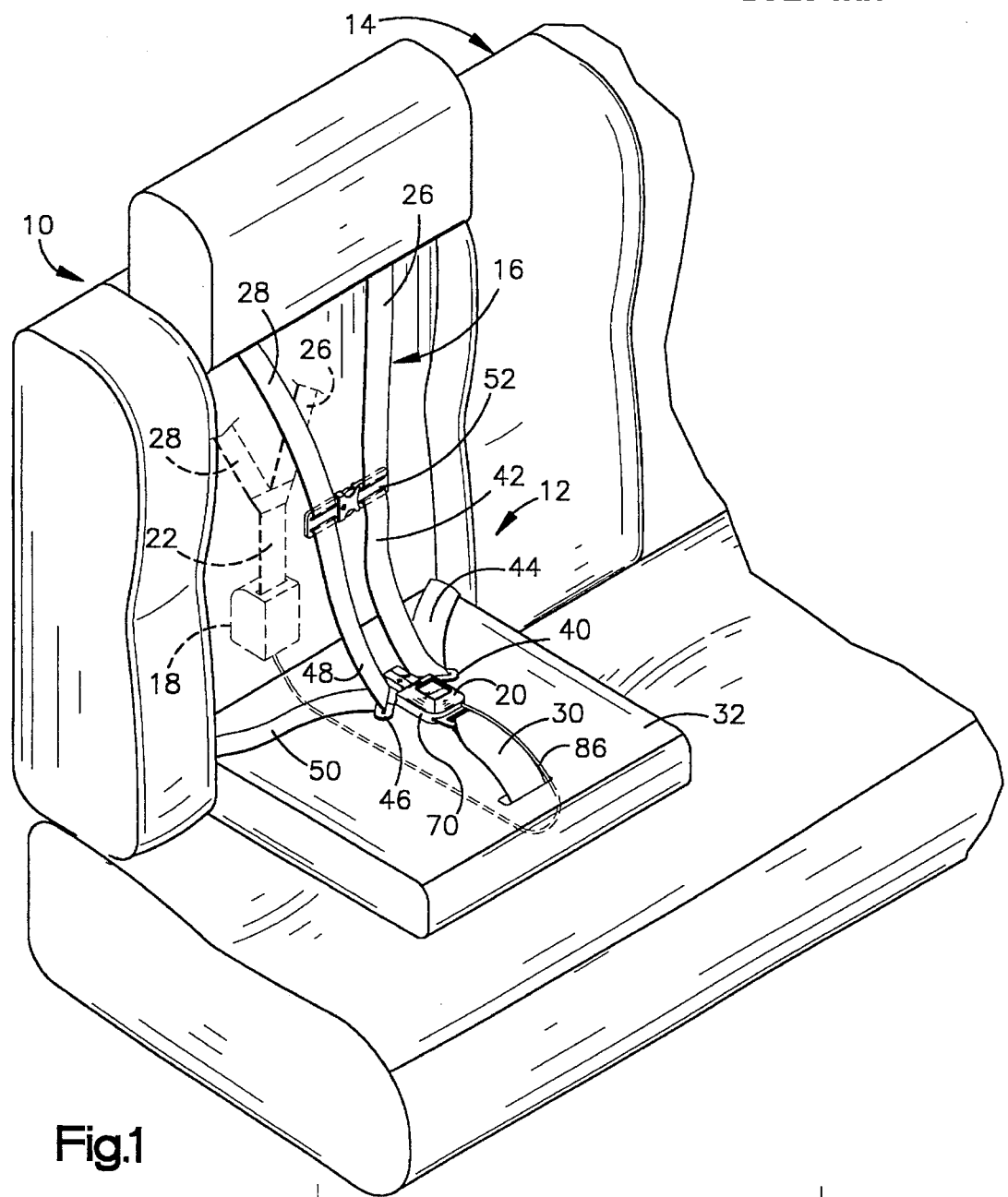
FIG. 1 is a view of a seat belt system comprising a first embodiment of the present invention.

A seat belt system 10 comprising a first embodiment of the present invention is shown in FIG. 1. The present invention can be used in a variety of seat belt systems. By way of example, the seat belt system 10 is a child restraint system associated with a child seat portion 12 of a vehicle seat 14. The seat belt system 10 includes seat belt webbing 16, a seat belt retractor 18 at the rear of the seat 14, and a seat belt buckle 20 at the front of the seat 14.

The webbing 16 has several distinct sections. A first section 22 of the webbing 16 extends upward from the retractor 18, as shown in dashed lines in FIG. 1. The first section 22 of the webbing 16 is connected to second and third sections 26 and 28 of the webbing 16. Each of the second and third sections 26 and 28 extends upward from the first section 22 at the rear of the seat 14, through openings (not shown) in the seat 14 to the front of the seat 14, and downward over the child seat portion 12 to locations at which they are fixed to the seat 14. A fourth section 30 of the webbing 16 anchors the buckle 20 to a child seat panel 32.

A first locking tongue 40 is connected with the second section 26 of the webbing 16. The first tongue 40 is slidable along the length of the second section 26, and is releasably lockable in the buckle 20. When the first tongue 40 is locked in the buckle 20, it defines a shoulder belt portion 42 and a lap belt portion 44 of the second section 26 of the webbing 16.

A second locking tongue 46 is similarly connected with the third section 28 of the webbing 16. When locked in the buckle 20, the second tongue 46 defines shoulder and lap belt portions 48 and 50 of the third section 28 of the webbing 16. An adjustment member 52 is connected with the shoulder belt portions 42 and 48 of the second and third sections 26 and 28 of the webbing 16. The adjustment member 52 adjusts and locates the shoulder belt portions 42 and 48 relative to a seated child in a known manner.

The buckle 20 is shown in greater detail in FIGS. 2–6. The buckle 20 has a front end surface 60 defining an opening 62. Each of the tongues 40 and 46 has a latch plate portion 63 (FIG. 3) which is movable into the buckle 20 through the opening 62. The buckle 20 further has a pushbutton 64 and other parts for releasably locking the two tongues 40 and 46 in the buckle 20. Such other parts may be constructed as known in the art, and may include, for example, a pair of leaf springs for releasably engaging the latch plate portions 63 of the two tongues 40 and 46. One such leaf spring 66 is shown schematically in FIG. 2. The parts of the buckle 20 that lock the tongues 40 and 46 in the buckle 20 may alternatively be constructed as disclosed in co-pending U.S. patent application Ser. No. 941,966, now U.S. Pat. No. 5,269,051 entitled "Buckle Assembly," filed Sep. 8, 1992 and assigned to TRW Vehicle Safety Systems Inc., or co-pending U.S. patent application Ser. No. 938,957, now U.S. Pat. No. 5,267,377 also entitled "Buckle Assembly," filed Sep. 1, 1992, and also assigned to TRW Vehicle Safety Systems Inc.

A first actuator assembly 70 is mounted on the buckle 20. The first actuator assembly 70 is constructed as disclosed in co-pending U.S. patent application Ser. No. 117,604, now U.S. Pat. No. 5,398,997 described above. The first actuator assembly 70 cooperates with the buckle 20 to indicate when the two tongues 40 and 46 are both locked in the buckle 20.

As shown in FIG. 3, the first actuator assembly 70 has a body 72 defining a cable compartment 74 and a slot 76. The slot 76 extends from the cable compartment 74 to the front end of the body 72. The cable compartment 74 contains an anchor pin 78 and a pulley 80 which is supported for rotation about a hub 82. A cable 84 extends into the cable compartment 74 from a sheath 86. The cable 84 extends around the pulley 80 to the anchor pin 78, at which it is fixed to the body 72. The cable 84 and the sheath 86 extend outward from the cable compartment 74 and further from the first actuator assembly 70 to the retractor 18, as shown in FIG. 1.

The first actuator assembly 70 further includes an actuator member 90. The actuator member 90 has a head 92, a base 94, and a shaft 96 connecting the head 92 with the base 94. The actuator member 90 is supported to move in the slot 76 pivotally about the base 94 from a first position shown in FIG. 3 to an intermediate position, as shown in FIG. 4. The actuator member 90 is further movable downward in the slot 76 from the intermediate position of FIG. 4 to a second position, as shown in FIG. 5. When the actuator member 90 moves from the intermediate position to the second position, the base 94 moves downward in the cable compartment 74 against the cable 84, and thus draws an additional length of the cable 84 out of the sheath 86 and into the cable compartment 74. An equal length of the cable 84 is simultaneously drawn into the sheath 86 and out of the retractor 18 at the other end of the cable 84.

As shown in FIG. 3, the first tongue 40 has a tab 100. When the first tongue 40 is moved into the buckle 20, the tab 100 moves against the head 92 of the actuator member 90 and moves the actuator member 90 pivotally from the first position of FIG. 3 to the intermediate position of FIG. 4. The second tongue 46 likewise has a tab 102. When the second tongue 46 is subsequently moved into the buckle 20 with the first tongue 40 as shown in FIG. 5, the tab 102 on the second tongue 40 moves against the head 92 of the actuator member 90 and moves the actuator member 90 downward from the intermediate position to the second position. The actuator member 90 then causes the cable 84 to move outward of the retractor 18, as described above. When the cable 84 is thus moved outward of the retractor 18, it is moved into an indicating position in which it indicates that the first and second tongues 40 and 46 are both locked in the buckle 20.

If the second tongue 46 is locked in the buckle 20 before the first tongue 40 is locked in the buckle 20, the tab 102 on the second tongue 46 will move the actuator member 90 pivotally from the first position of FIG. 3 to an alternative intermediate position, as shown in FIG. 6. The tab 100 on the first tongue 40 will then move against the head 92 of the actuator member 90 to move the actuator member 90 downward from the alternative intermediate position to the second position when the first tongue 40 is subsequently locked in the buckle 20 with the second tongue 46. Accordingly, the actuator member 90 is moved to the second position, and the cable 84 is thus moved to the indicating position, only when both of the two tongues 40 and 46 are locked in the buckle 20.

Parts of the retractor 18 are shown schematically in FIGS. 7A and 7B. The retractor 18 includes a frame 110 and a spool 112. The frame 110 has a rear wall 116, a first side wall 118, and a second side wall 120. The spool 112 has a longitudinal central axis 121 and a plurality of ratchet teeth 122. Each of the ratchet teeth 122 has a front edge surface 123 and a rear edge surface 124. The spool 112 is supported between the side walls 118 and 120 of the frame 110 for rotation about the axis 121 in a winding direction, which is clockwise as viewed in the drawings, and in an unwinding direction, which is counterclockwise as viewed in the drawings. A rewind spring (not shown) in the retractor 18 is stressed upon rotation of the spool 112 in the unwinding direction and biases the spool 112 to rotate back in the winding direction.

Also shown schematically in FIGS. 7A and 7B is a locking pawl 126 and an emergency locking mechanism 128. The pawl 126 has an axis 130, and is supported between the side walls 118 and 120 of the frame 110 for pivotal movement about the axis 130 in a known manner. The pawl 126 is thus movable between a non-locking position in which the pawl 126 is spaced from the ratchet teeth 122 on the spool 112, as shown in FIG. 7A, and a locking position in which the pawl 126 extends into the path of movement of the ratchet teeth 122 to block rotation of the spool 112 in the unwinding direction, as shown in FIG. 7B.

The emergency locking mechanism 128 includes an inertia member 132 and a lever 134. Like the pawl 126, the inertia member 132 and the lever 134 are supported between the side walls 118 and 120 of the frame 110 for pivotal movement about an axis 136 in a known manner. When the vehicle experiences a predetermined amount of deceleration, such as occurs in a collision, the inertia member 132 and the lever 134 move pivotally about the axis 136 from the position shown in FIG. 7A to the position shown in FIG. 7B. The lever 134 simultaneously moves against the pawl 126 to move the pawl 126 from the unlocking position to the locking position. The spool 112 is thus blocked from rotating in the unwinding direction upon the occurrence of vehicle deceleration indicative of a collision. As a result, the webbing 16 cannot be further unwound from the spool 112 during a collision, and restrains the vehicle occupant accordingly.

The retractor 18 further includes a second actuator assembly 150, as shown in detail in FIGS. 8–12. The second actuator assembly 150 cooperates with the buckle 20, the first actuator assembly 70, and the cable 84 to move the pawl 126 into the locking position when the two tongues 40 and 46 on the webbing 16 are both locked in the buckle 20.

The second actuator assembly 150 includes a first actuator member 152, a second actuator member 154, and a spring 156. Those parts of the second actuator assembly 150 are supported on a panel 160 which is mounted on the side wall 120 of the retractor frame 110. A cover 162 for the second actuator assembly 150 is received over the panel 160.

The panel 160 has a plurality of fastening pins 164. The fastening pins 164 extend through certain openings 166 in the side wall 120 of the frame 110 to secure the panel 160 to the side wall 120. The cover 162 also has a plurality of fastening pins 168 which extend into others of the openings 166 in the side wall 120 through aligned openings 170 in the panel 160.

Figure 8:
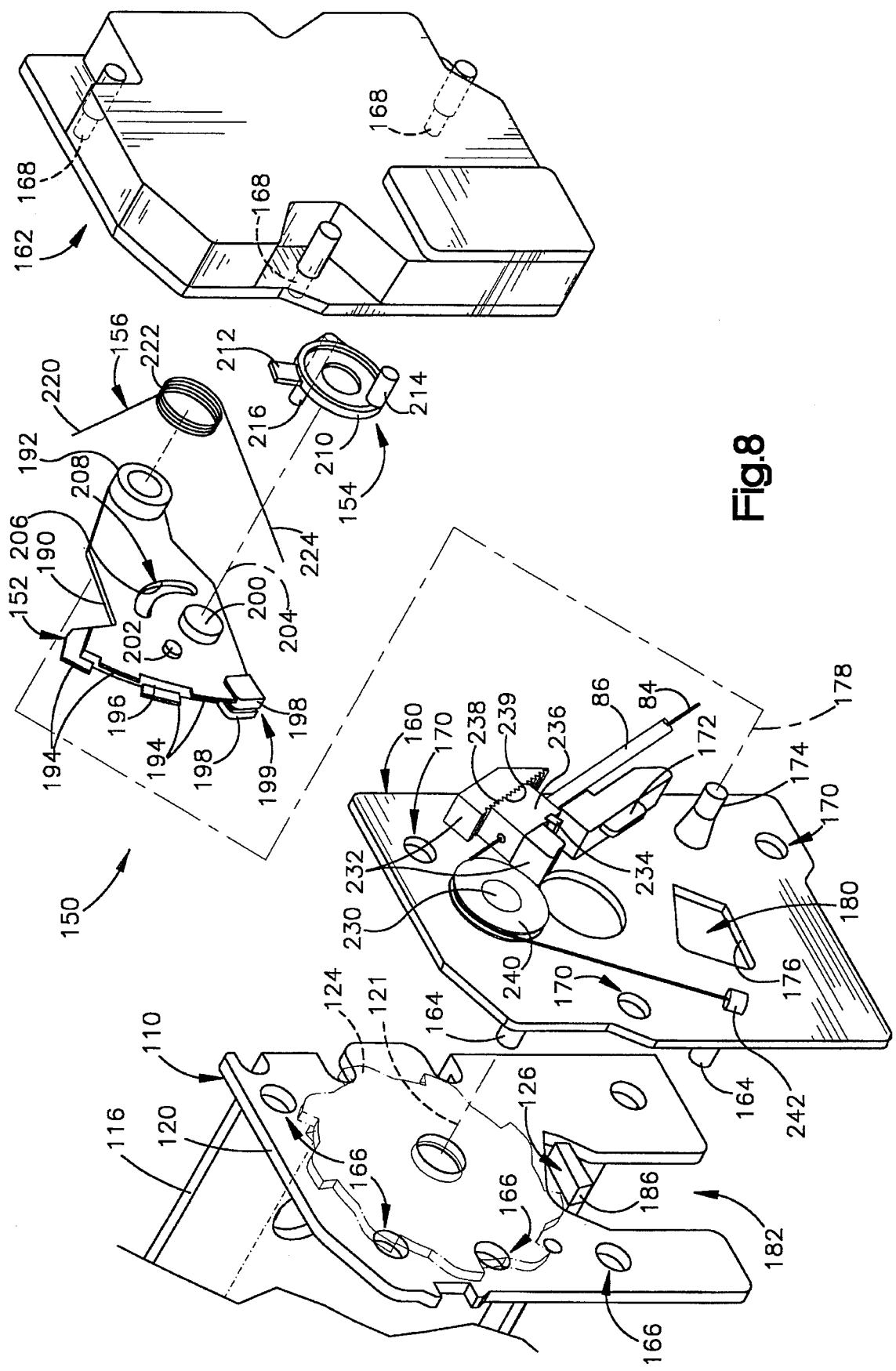
FIG. 8 is an exploded perspective view of parts of the seat belt system of FIG. 1.

The panel 160 includes a retainer structure 172, a stub shaft 174, and an inner edge surface 176. The stub shaft 174 is centered on an axis 178 which is parallel to the spool axis 121. The inner edge surface 176 defines an opening 180 through the panel 160. As shown in FIG. 8, the opening 180 through the panel 160 is aligned with the upper end portion of a slot 182 which extends through the side wall 120 of the frame 110. The pawl 126 (FIGS. 7A, 7B) has an outer end portion 186 which extends outward through the slot 182 in the side wall 120 and further outward through the opening 180 in the panel 160. When the pawl 126 moves between the positions shown in FIGS. 7A and 7B, the outer end portion 186 of the pawl 126 moves vertically in the slot 182 and the opening 180.

The first actuator member 152 has a somewhat elongated body wall 190 with a hub 192 at one end. As shown in FIGS. 9–12, the hub 192 is received over the stub shaft 174 on the panel 160, and thus supports the first actuator member 152 for pivotal movement about the axis 178 relative to the panel 160 and the frame 110. A plurality of cable tabs 194 project from an arcuate edge surface 196 at the other end of the body wall 190. The cable tabs 194 are arranged in a staggered array extending along the length of the edge surface 196. A pair of base walls 198 at the bottom of the edge surface 196 are spaced from each other to define a slot 199 which extends lengthwise relative to the edge surface 196.

The first actuator member 152 further includes a stub shaft 200 and a stop member 202, both of which project from the same side of the body wall 190 as the hub 192. The stub shaft 200 is centered on an axis 204 which is parallel to the axis 178, and the stop member 202 is spaced radially from the stub shaft 200. An inner edge surface 206 of the body wall 190 defines an arcuate slot 208 which extends through the body wall 190 at a location between the stub shaft 200 and the hub 192.

The second actuator member 154 has an annular hub portion 210. The hub portion 210 is received over the stub shaft 200 on the first actuator member 152, and thus supports the second actuator member 154 for rotation about the axis 204 relative to the first actuator member 152. A radially projecting stop member 212 on the hub portion 210 limits rotation of the second actuator member 154 about the axis 204 in the counterclockwise direction, as viewed in the drawings, when the stop member 212 moves against the stop member 202 on the first actuator member 152.

The second actuator member 154 further has an outer arm 214 projecting axially outward from one side of the hub portion 210, and an inner arm 216 projecting axially inward from the other side of the hub portion 210. The inner arm 216 extends inward through the slot 208, and further inward beneath the outer end portion 186 of the pawl 126. The slot 208 is large enough to allow the inner arm 216 to move with the hub portion 210 in the clockwise direction without interference.

The spring 156 has an upper arm 220 engaged with the retainer structure 172 on the panel 160, and has a central coiled portion 222 received coaxially over the hub 192 on the first actuator member 152. A lower arm 224 of the spring 156 engages the outer arm 214 on the second actuator member 154. The spring 156 thus exerts a bias against the first actuator member 152 through the second actuator member 154. The bias of the spring 156 urges the first actuator member 152 to pivot about the axis 178 in the counterclockwise direction. Additionally, because the outer arm 214 on the second actuator member 154 is located to the left of the axis 204, as viewed in FIGS. 9–12, the bias of the spring 156 simultaneously urges the second actuator member 154 to rotate about the axis 204 in a counterclockwise direction relative to the first actuator member 152.

Other parts of the panel 160 support the cable 84 and the sheath 86. Such other parts of the panel 160 include a stub shaft 230, a pair of clamps 232, and a locking tab 234. A sheath holder 236, in which the end of the sheath 86 is fixed, is clamped between the two clamps 232. A plurality of teeth 238 on the sheath holder 236 interlock with a plurality of opposed teeth 239 on one of the clamps 232 to secure the sheath holder 236 from moving between the clamps 232 in the longitudinal direction of the cable 84. Adjustments of the position of the cable 84 can be made by adjusting the position of the sheath holder 236 longitudinally between the clamps 232. The locking tab 234 secures the sheath holder 236 from moving between the clamps 232 in a direction outward from the panel 160.

The cable 84 extends upward from the sheath holder 236, around a pulley 240 on the stub shaft 230, and downward from the pulley 240 to the first actuator member 152. As shown in FIGS. 9–2, the cable 84 extends downward over the edge surface 196 of the first actuator member 152 between the staggered cable tabs 194, and further through the slot 199 to a cable anchor 242 which is received between the base walls 198. The cable 84 is thus connected directly with the first actuator member 152 to pivot the first actuator member 152 about the axis 178 in the clockwise direction against the bias of the spring 156 upon longitudinal movement of the cable 84 outward from the retractor 18.

When neither of the two tongues 40 and 46 on the webbing 16 is locked in the buckle 20, the second actuator assembly 150 has the unactuated condition shown in FIG. 9. The inner arm 216 on the second actuator member 154 is then spaced downward from the outer end portion 186 of the pawl 126, and the pawl 126 is in the unlocking position. When only one of the two tongues 40 and 46 is locked in the buckle 20, the parts of the second actuator assembly 150 remain in the initial, unactuated positions shown in FIG. 9 because the cable 84 is not moved by the first actuator assembly 70 until both of the two tongues 40 and 46 are locked in the buckle 20. However, the pawl 126 can be moved from the unlocking position to the locking position by the emergency locking mechanism 128 when only one of the two tongues 40 and 46 is locked in the buckle 20, because the emergency locking mechanism 128 operates independently of the second actuator assembly 150, as shown in FIGS. 7A and 7B.

Figure 11:
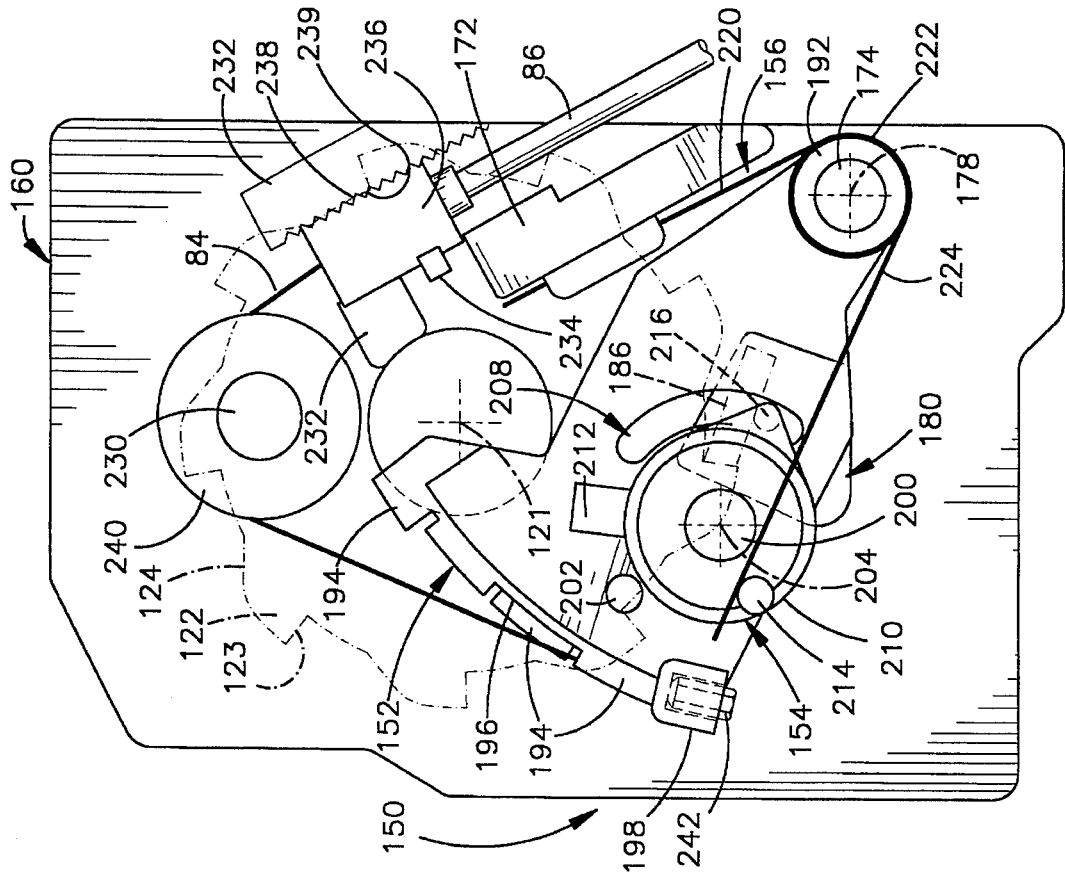
FIG. 11 is a view showing the parts of FIG. 8 in actuated positions.

When both of the two tongues 40 and 46 on the webbing 16 are locked in the buckle 20, the first actuator assembly 70 indicates that both of the tongues 40 and 46 are locked in the buckle 20 by withdrawing a length of the cable 84 from the retractor 18, as described above. The cable 84 then lifts the first actuator member 152 pivotally upward against the bias of the spring 156 from the initial position of FIG. 9 to a partially actuated position, as shown in FIG. 10, and further upward to an actuated position, as shown in FIG. 11. The second actuator member 154 moves upward with the first actuator member 152 when the first actuator member 152 is moved into the actuated position. The inner arm 216 on the second actuator member 154 then moves upward into contact with the outer end portion 186 of the pawl 126 as shown in FIG. 10, and further upward against the outer end portion 186 to lift the outer end portion 186 from the position of FIG. 10 to the position of FIG. 11. The second actuator member 154 thus move the pawl 126 pivotally about the axis 130 (FIGS. 7A, 7B) from the unlocking position to the locking position. The second actuator assembly 150 thus operates to block rotation of the spool 112 in the unwinding direction, and thereby to place the webbing 16 in a cinched condition, in response to locking of both of the two tongues 40 and 46 in the buckle 20.

Although the webbing 16 cannot be further withdrawn from the retractor 18 when both of the two tongues 40 and 46 are locked in the buckle 20, a vehicle occupant may wish to retract the webbing 16 further into the retractor 18 when both of the two tongues 40 and 46 are locked in the buckle 20, such as to tighten or take up slack in the webbing 16. Therefore, the second actuator assembly 150 further operates to permit the spool 112 to rotate in the winding direction, and thus to enable such further retraction of the webbing 16, while continuing to block rotation of the spool 112 in the unwinding direction.

Figure 12:
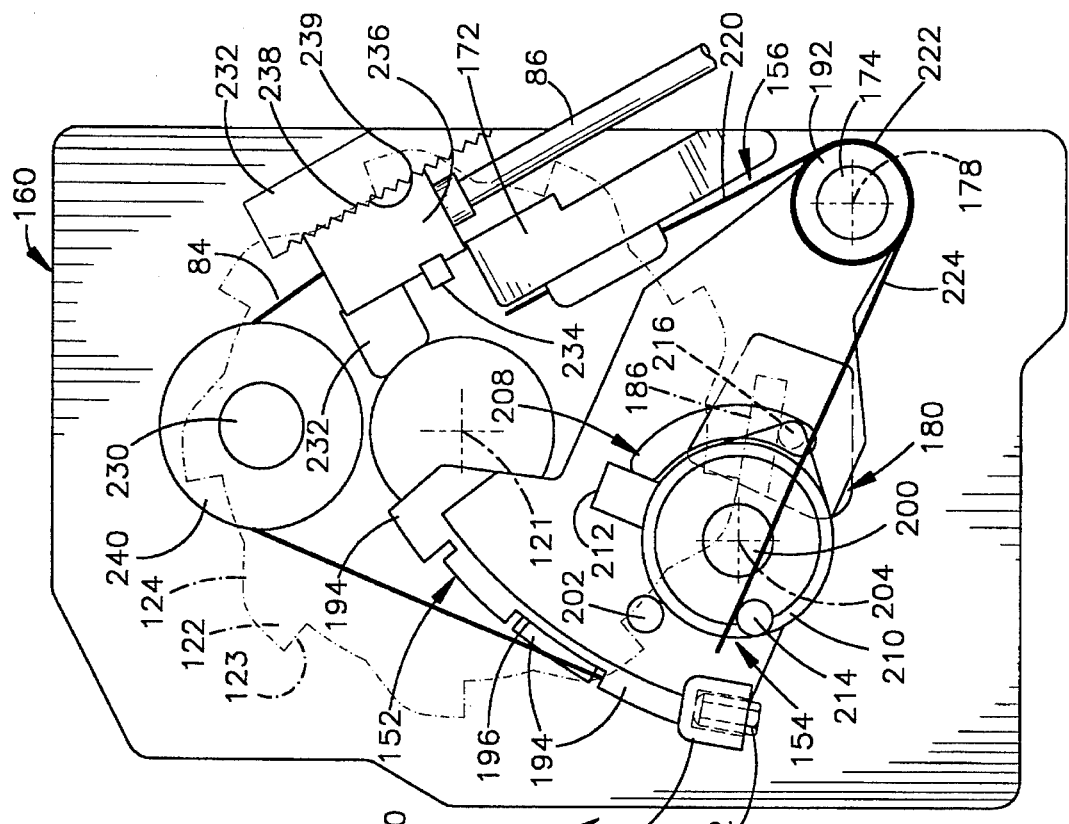
FIG. 12 is a view showing the parts of FIG. 8 in different actuated positions.

As shown in FIG. 11, the cable 84 holds the first actuator member 152 in the actuated position against the bias of the spring 156 to block rotation of the spool 112 in the unwinding direction. If the rewind spring in the retractor 18 then rotates the spool 112 in the winding direction, i.e. clockwise as viewed in FIG. 11, the rear edge surfaces 124 of the ratchet teeth 122 will act as cam surfaces which move the pawl 126 downward from the locking position of FIG. 11 to an intermediate position, as shown in FIG. 12. The outer end portion 186 of the pawl 126 will then move the inner arm 216 on the second actuator member 154 downward an equal amount, and will thus rotate the second actuator member 154 a corresponding amount about the axis 204 in a clockwise direction against a further bias of the spring 156. The second actuator assembly 150 thus enables the spool 112 to rotate in the winding direction by moving the pawl 126 out of the locking position against a further bias of the spring 156 when the first actuator member 152 is being held in the actuated position by the cable 84. However, the bias of the spring 156 then acting in the counterclockwise direction will subsequently move the pawl 126 back to the locking position of FIG. 11 in a reversal of the foregoing movements each time a front edge surface 123 of a ratchet tooth 122 moves back past the pawl 126 in the clockwise direction. The second actuator assembly 150 thus continues to block rotation of the spool 112 in the winding direction.

When one of the two tongues 40 and 46 is unlocked and removed from the buckle 20, the actuator member 90 in the first actuator assembly 70 is released for movement from the second position of FIG. 5 to the intermediate position of FIG. 4, or to the alternative intermediate position of FIG. 6, depending on which of the two tongues 40 and 46 is first unlocked and removed from the buckle 20. The cable 84 is then released for movement outward of the buckle 20 and inward of the retractor 18 under the bias of the spring 156 in the retractor 18. As a result, the spring 156 moves the first actuator member 152 pivotally downward from the actuated position of FIG. 11 to the initial position of FIG. 9. The inner arm 216 on the second actuator member 154 moves downward with the first actuator member 152, and thus releases the pawl 126 to drop from the locking position to the unlocking position under the force of gravity.

As described above, the webbing 16 in the first embodiment of the invention is not cinched by the second actuator assembly 150 until movement of the cable 84 indicates that both of the two tongues 40 and 46 on the webbing 16 are locked in the buckle 20. However, the second actuator assembly 150 could be modified to operate to cinch the webbing 16 in the same manner if the cable 84 were moved the same amount in response to locking of a single tongue in a buckle, or in response to locking of one of a pair tongues in a buckle. The amount of movement of the cable 84 which is required for the second actuator assembly 150 to cinch the webbing 16 also be varied, such as by varying the initial, unactuated positions of the first actuator member 152 and the cable 84. Moreover, the invention is not limited to the use of a cable for moving the first actuator member 152, because the first actuator member 152 could be moved equally by a magnet, a solenoid or the like in response to an electrical signal which indicates that the webbing 16 is to be cinched.

As noted above, the first actuator assembly 70 is constructed as disclosed in co-pending U.S. patent application Ser. No. 117,604. That co-pending application also discloses an alternative actuator assembly which moves a cable a first amount when a first tongue is locked in a buckle, and which subsequently moves the cable a second amount to an actuated position when a second tongue is locked in the buckle with the first tongue. The present invention will work equally well with such an apparatus, because the second actuator assembly 150 permits the cable 84 similarly to move a first amount before the pawl 126 is moved into the locking position, as shown, for example, in FIG. 10. The emergency locking mechanism 128 would continue to provide redundant locking capability during such movement of the cable 84.

Figures 13, 14:
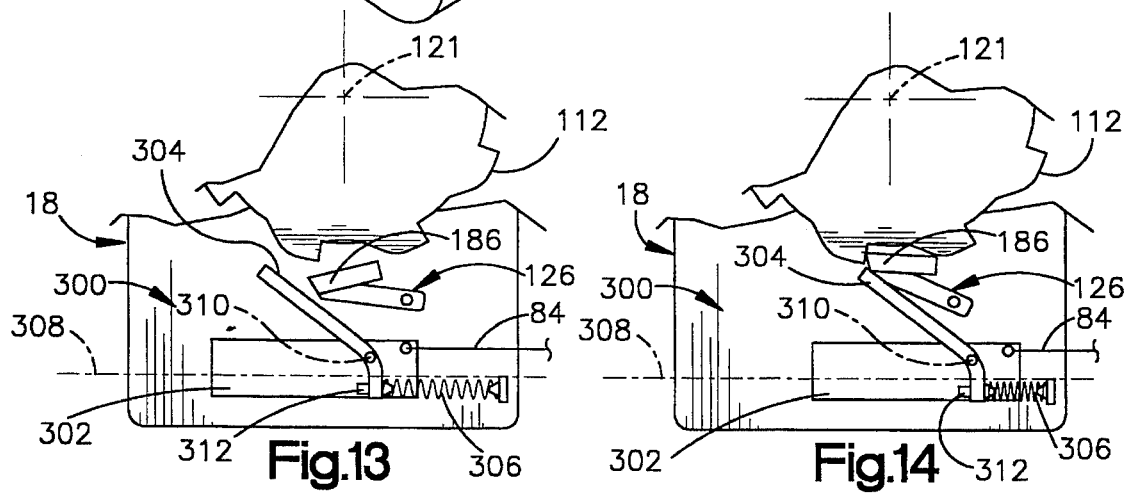
FIG. 13 is a view of parts of a seat belt system which comprises a second embodiment of the present invention.
FIG. 14 is a view showing the parts of FIG. 13 in actuated positions.

A second embodiment of the present invention is shown schematically in FIGS. 13 and 14. In the second embodiment of the invention, an alternative actuator assembly 300 is installed in the retractor 18 in place of the second actuator assembly 150 described above.

The alternative actuator assembly 300 includes a first actuator member 302, a second actuator member 304, and a spring 306. The first actuator member 302 is supported for movement in the retractor 18 along a transverse axis 308 which is spaced from and perpendicular to the spool axis 121. The second actuator member 304 is supported on the first actuator member 302 for rotation relative to the first actuator member 302 about an axis 310 which is spaced from and parallel to the spool axis 121. Rotation of the second actuator member 304 about the axis 310 in the clockwise direction, as viewed in FIG. 13, is limited by a stop member 312 on the first actuator member 302. The spring 306 acts on the first actuator member 302 through the second actuator member 304, and urges the first and second actuator members 302 and 304 toward the initial, unactuated positions shown in FIG. 13.

When the cable 84 is withdrawn from the retractor 18 to indicate that the webbing 16 is to be cinched, as described above with reference to the first embodiment of the invention, the cable 84 pulls the first actuator member 302 along the axis 308 from the unactuated position to an actuated position, as shown in FIG. 14. The second actuator member 304 moves along the axis 308 with the first actuator member 302, and thus moves against the outer end portion 186 of the pawl 126 to move the pawl 126 pivotally into the locking position.

When the pawl 126 is in the locking position as shown in FIG. 14, it can move pivotally back against the second actuator member 304 to rotate the second actuator member 304 about the axis 310 in the counterclockwise direction against a further bias of the spring 306. The pawl 126 will move pivotally back against the second actuator member 304 in this manner when the ratchet teeth 122 move against the pawl 126 in the clockwise direction. However, the pawl 126 will be returned to the locking position by the second actuator member 304 under the bias of the spring 306 each time a ratchet tooth 122 moves past the pawl 126 in the clockwise direction. The alternative actuator assembly 300 thus operates to cinch the webbing 16 by moving the first actuator member 302 into an actuated position, and also operates to permit further retraction of the webbing 16 when the first actuator member 302 is in the actuated position.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a frame;

a spool having rachet teeth, said spool being supported on said frame for rotation in a winding direction and an unwinding direction;

a locking pawl supported on said frame for movement between an unlocking position spaced from said ratchet teeth and a locking position located in the path of movement of said ratchet teeth, said pawl blocking rotation of said spool in said unwinding direction when said pawl is in said locking position; and actuator means for moving said pawl from said unlocking position to said locking position, said actuator means including a first actuator member, a second actuator member, and a spring;

said first actuator member being supported for movement relative to said frame against the bias of said spring, said first actuator member being thus movable into an actuated position;

said second actuator member being supported for movement relative to said frame with said first actuator member, said second actuator member being thus movable against said pawl to move said pawl from said unlocking position to said locking position upon movement of said first actuator member into said actuated position;

said second actuator member is further supported for movement relative to said first actuator member against a bias of said spring when said first actuator member is in said actuated position, said second actuator member being thus movable relative to said first actuator member by said pawl, whereby said second actuator member enables said pawl to be moved by said ratchet teeth from said locking position toward said unlocking position against the bias of said spring upon rotation of said spool in said winding direction when said first actuator member is in said actuated position.

2. Apparatus as defined in claim, 2 wherein said spool is supported for rotation about a spool axis, said first actuator member being supported for rotation relative to said frame about a first actuator axis parallel to said spool axis.

3. Apparatus as defined in claim 2 wherein said second actuator member is supported for rotation relative to said first actuator member about a second actuator axis parallel to said first actuator axis.

4. Apparatus as defined in claim 1 wherein said spool is supported for rotation about a spool axis, said first actuator member being supported for movement relative to said frame along a first actuator axis transverse to said spool axis.

5. Apparatus as defined in claim 4 wherein said second actuator member is supported for rotation relative to said first actuator member about a second actuator axis parallel to said spool axis.

6. Apparatus as defined in claim 1 further comprising an inertia member, means for supporting said inertia member to move relative to said frame upon deceleration of said frame, and means for moving said pawl from said unlocking position to said locking position in response to movement of said inertia member relative to said frame when said first actuator member is not in said actuated position.

7. Apparatus as defined in claim 1 further comprising a cable, a locking tongue connectable with seat belt webbing, a buckle having means for locking said tongue in said buckle, and indicator means for moving said cable into an indicating position in response to locking of said tongue in said buckle, said actuator means moving said pawl from said unlocking position to said locking position in response to movement of said cable into said indicating position.

8. Apparatus as defined in claim 7 wherein said cable is connected directly with said first actuator member to move said first actuator member into said actuated position upon movement of said cable into said indicating position.

9. Apparatus comprising:

a frame;

a spool having rachet teeth, said spool being supported on said frame for rotation in a winding direction and an unwinding direction;

a locking pawl supported on said frame for movement between an unlocking position spaced from said ratchet teeth and a locking position located in the path of movement of said ratchet teeth, said pawl blocking rotation of said spool in said unwinding direction when said pawl is in said locking position; and actuator means for moving said pawl from said unlocking position to said locking position, said actuator means including a first actuator member, a second actuator member, and a spring;

said first actuator member being supported for movement relative to said frame against the bias of said spring, said first actuator member being thus movable into an actuated position;

said second actuator member being supported for movement relative to said frame with said first actuator member, said second actuator member being thus movable against said pawl to move said pawl from said unlocking position to said locking position upon movement of said first actuator member into said actuated position;

a cable;

a locking tongue connectable with seat belt webbing;

a buckle having means for locking said tongue in said buckle; and indicator means for moving said cable into an indicating position in response to locking of said tongue in said buckle;

said actuator means moving said pawl from said unlocking position to said locking position in response to movement of said cable into said indicating position.

10. An apparatus as defined in claim 9 wherein said second actuator member is further supported for movement relative to said first actuator member against a bias of said spring when said first actuator member is in said actuated position, said second actuator member being thus movable relative to said first actuator member by said pawl, whereby said second actuator member enables said pawl to be moved by said ratchet teeth from said locking position toward said unlocking position against the bias of said spring upon rotation of said spool in said winding direction when said first actuator member is in said actuated position.

11. Apparatus as defined in claim 9 wherein said spool is supported for rotation about a spool axis, said first actuator member being supported for rotation relative to said frame about a first actuator axis parallel to said spool axis.

12. Apparatus as defined in claim 11 wherein said second actuator member is supported for rotation relative to said first actuator member about a second actuator axis parallel to said first actuator axis.

13. Apparatus as defined in claim 9 wherein said spool is supported for rotation about a spool axis, said first actuator member being supported for movement relative to said frame along a first actuator axis transverse to said spool axis.

14. Apparatus as defined in claim 13 wherein said second actuator member is supported for rotation relative to said first actuator member about a second actuator axis parallel to said spool axis.

15. Apparatus as defined in claim 9 further comprising an inertia member, means for supporting said inertia member to move relative to said frame upon deceleration of said frame, and means for moving said pawl from said unlocking position to said locking position in response to movement of said inertia member relative to said frame when said first actuator member is not in said actuated position.

16. Apparatus as defined in claim 9 wherein said cable is connected directly with said first actuator member to move said first actuator member into said actuated position upon movement of said cable into said indicating position.

17. Apparatus comprising:

a frame;

a spool having rachet teeth, said spool being supported on said frame for rotation in a winding direction and an unwinding direction;

a locking pawl supported on said frame for movement between an unlocking position spaced from said ratchet teeth and a locking position located in the path of movement of said ratchet teeth, said pawl blocking rotation of said spool in said unwinding direction when said pawl is in said locking position; and actuator means for moving said pawl from said unlocking position to said locking position, said actuator means including a first actuator member, a second actuator member pivotally received on said first actuator member, and a spring;

said first actuator member being supported for movement relative to said frame against the bias of said spring, said first actuator member being thus movable into an actuated position;

said second actuator member being supported for movement relative to said frame with said first actuator member, said second actuator member being thus movable against said pawl to move said pawl from said unlocking position to said locking position upon movement of said first actuator member into said actuated position.

18. Apparatus as defined in claim 17 further comprising an inertia member, means for supporting said inertia member to move relative to said frame upon deceleration of said frame, and means for moving said pawl from said unlocking position to said locking position in response to movement of said inertia member relative to said frame when said first actuator member is not in said actuated position.

19. Apparatus as defined in claim 17 further comprising a cable, a locking tongue connectable with seat belt webbing, a buckle having means for locking said tongue in said buckle, and indicator means for moving said cable into an indicating position in response to locking of said tongue in said buckle, said actuator means moving said pawl from said unlocking position to said locking position in response to movement of said cable into said indicating position.

20. Apparatus as defined in claim 19 wherein said cable is connected directly with said first actuator member to move said first actuator member into said actuated position upon movement of said cable into said indicating position.

* * * * *